US008530818B2

(12) United States Patent
Heck et al.

(10) Patent No.: US 8,530,818 B2

(45) Date of Patent: Sep. 10, 2013

(54) APPARATUS, METHOD AND SYSTEM FOR PROVIDING REFLECTION OF AN OPTICAL SIGNAL

(75) Inventors: John Heck, Berkeley, CA (US); Ansheng Liu, Cupertino, CA (US); Mario J. Paniccia, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 411 days.

(21) Appl. No.: 12/825,257

(22) Filed: Jun. 28, 2010

(65) Prior Publication Data

US 2011/0315858 A1 Dec. 29, 2011

(51) Int. Cl.
*H03F 3/08* (2006.01)

(52) U.S. Cl.
USPC ........ 250/214 A; 250/216; 250/239; 257/441; 385/15; 385/83; 385/88

(58) Field of Classification Search
USPC .................. 250/214 A, 208.1, 227.11, 214.1, 250/214 R, 216, 226, 239; 257/431, 432, 257/436; 385/4, 14, 15, 47–52, 65, 83, 88–92
See application file for complete search history.

(56) References Cited

U.S. PATENT DOCUMENTS

| | | | | |
|---|---|---|---|---|
| 6,516,116 | B1 | 2/2003 | Murray et al. | |
| 2003/0019838 | A1 * | 1/2003 | Shaw et al. | 216/20 |
| 2007/0146583 | A1 | 6/2007 | Dreher et al. | |
| 2009/0148169 | A1 | 6/2009 | Porjo | |

FOREIGN PATENT DOCUMENTS

KR 20040099656 12/2004

OTHER PUBLICATIONS

"International Search Report and Written Opinion of the International Searching Authority for Application No. PCT/US2011/041978", (Feb. 17, 2012), Whole Document.

U.S. Appl. No. 12/567,601, filed Sep. 25, 2009.

Hsu-Liang Hsiao, et al., Compact and Passive-Alignment 4-Channel x 2.5-Gbps Optical Benches with 45° Micro-Reflectors, Dec. 21, 2009, vol. 17, No. 26, Optics Express 24250, pp. 11.

* cited by examiner

*Primary Examiner* — Francis M Legasse, Jr.

(74) *Attorney, Agent, or Firm* — Blakely, Sokoloff, Taylor & Zafman LLP

(57) ABSTRACT

Techniques and architectures for providing a reflective target area of an integrated circuit die assembly. In an embodiment, a reflective bevel surface of a die allows an optical signal to be received from the direction of a side surface of a die assembly for reflection into a photodetector. In another embodiment, one or more grooves in a coupling surface of the die provide respective leverage points for aligning a target area of the bevel surface with a detecting surface of the photodetector.

26 Claims, 6 Drawing Sheets

FIG. 3A
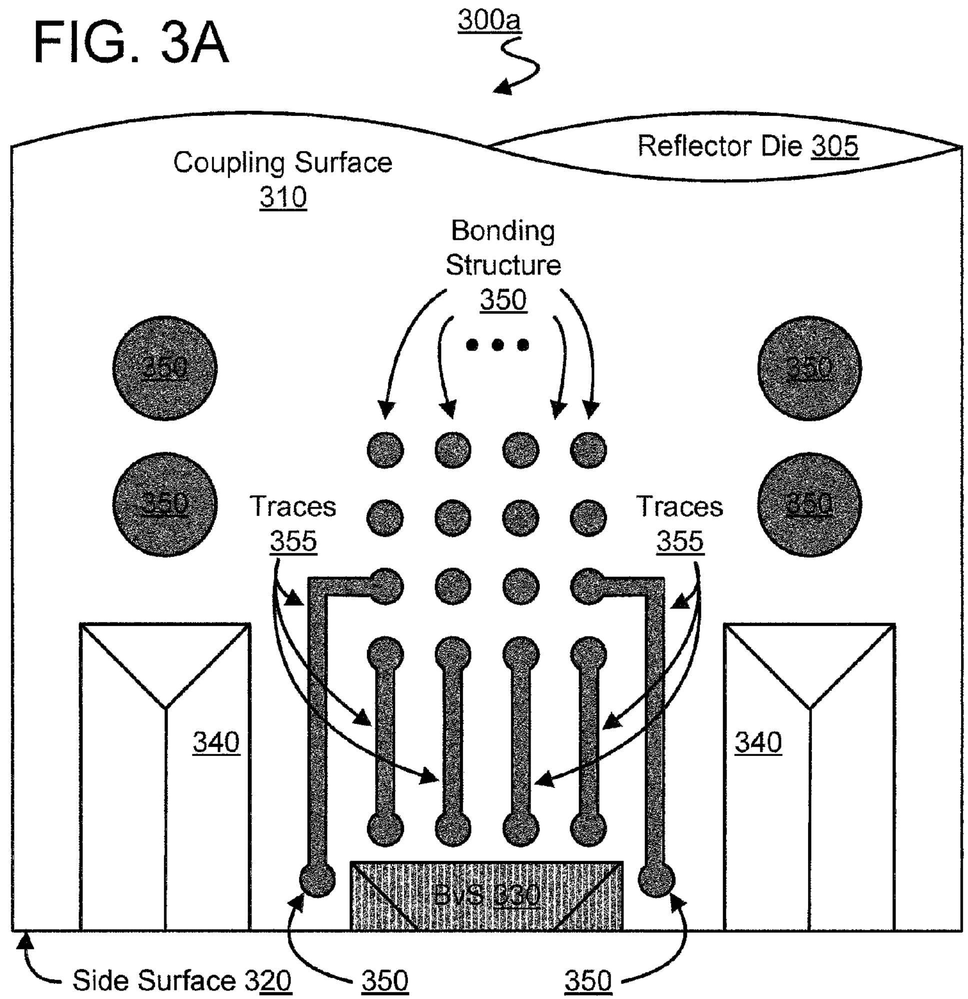
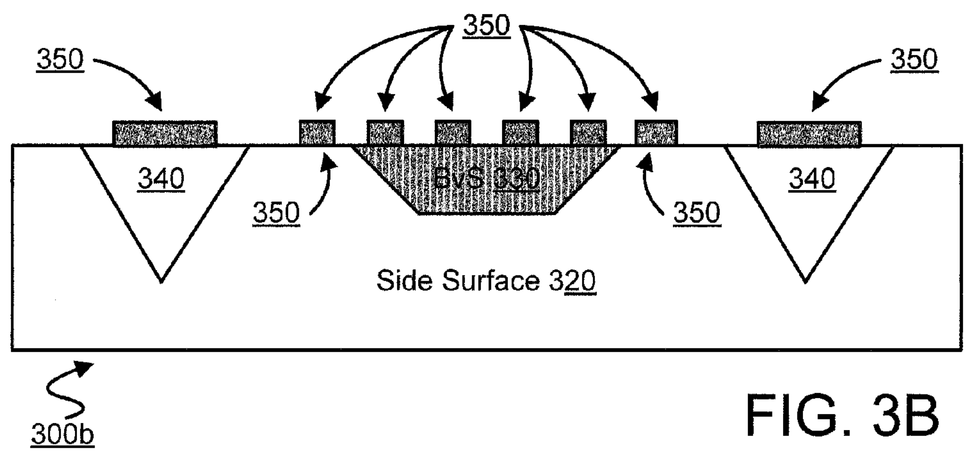
FIG. 3B

350
Amplifier Die 370
Photodetector Die 360
350
340
340
330
350
350
Side Surface 320
300d 300e
Reflector Die 305
Coupling Surface
310
Package Substrate 380
355
Amplifier Die 370
355
340
340
320
330
Photodetector Die
360
Pkg. Substrate 380
Amplifier Die 370
Photodetector Die 360
340
330
340
350
350
Side Surface 320
300f

APPARATUS, METHOD AND SYSTEM FOR PROVIDING REFLECTION OF AN OPTICAL SIGNAL

BACKGROUND

1. Technical Field

Embodiments of the invention relate generally to structures for directing an optical signal in a photonic device. More particularly, certain embodiments relate to a reflector die for reflecting an optical signal into a photodetector for generating a corresponding electrical signal.

2. Background Art

Architectures for photonic devices often rely upon a silicon-layer-waveguide-based approach in which a planar silicon layer of a substrate functions as a waveguide to carry an optical signal. Due to the absorption qualities of silicon, such approaches can only be implemented for a limited range of optical signal wavelengths. For example, silicon layer waveguide structures are compatible with larger wavelength optical signals—e.g. lasers having wavelengths around 1310 nm. However, smaller wavelength optical signals—e.g. in the range of 850 nm—cannot be effectively exchanged, due to silicon's absorption coefficient at such wavelengths.

In these photonic device architectures, such a range of wavelengths can also constrain the use of photodetectors to convert optical signals into corresponding electrical signals. Photodetectors such as normal incidence photodetectors (NIPDs) may be fairly readily used for lasers operating in the 850 nm range, for example. However, for larger wavelength—e.g. 1310 nm—lasers, an NIPD's active area must be much smaller to achieve high-bandwidth performance at such larger wavelengths. For such larger wavelength signals, the required precision for aligning optics (e.g. lens, mirror, etc.) with such a small active area of a photodetector has been very difficult to achieve in volume.

BRIEF DESCRIPTION OF THE DRAWINGS

The various embodiments of the present invention are illustrated by way of example, and not by way of limitation, in the figures of the accompanying drawings and in which:

FIGS. 3A and 3B are block diagrams illustrating select elements of a method for metalizing a reflector die according to an embodiment.

DETAILED DESCRIPTION

Certain embodiments provide a reflector die allowing operation of an optical receiver which is compatible with 1310 nm as well as 850 nm optical signals, the latter of which is required for backward-compatibility with existing optical communication standards. Unlike wave-guide based silicon photonics devices, various embodiments implement architectures wherein free-space optics can focus both wavelengths onto a normal-incidence photodetector (NIPD). In such architectures, optical signals may enter a die assembly along a side surface which is perpendicular to a base—e.g. a circuit board—to which the die assembly is connected.

Various embodiments comprise a reflector die fabricated from a substrate which is metalized to include an optical-quality facet to reflect light. The reflector die may also include optical alignment features such as V-grooves to provide precise alignment when bonding the reflector die to one or more other components. Certain embodiments further comprise a normal incidence photodetector (NIPD) and/or associated integrated circuits (ICs) such as a trans-impedance amplifier (TIA) bonded to the reflector die. The reflector die may furnish bondpads or similar bonding structures to which the NIPD and/or TIA may bond. Additionally or alternatively, the reflector die may include one or more traces for interconnecting components bonded thereto.

Figure 1A:
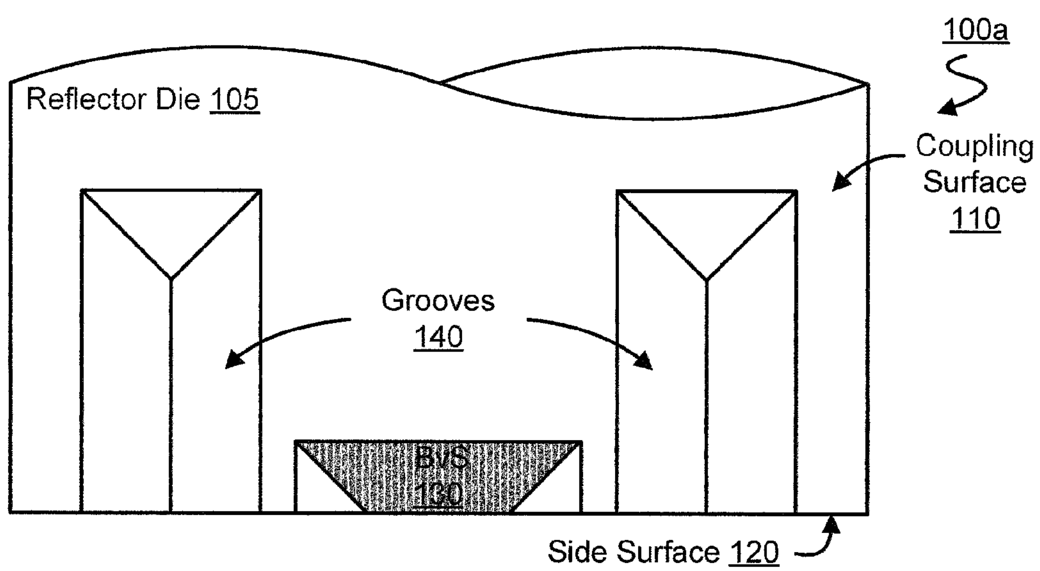
FIGS. 1A through 1C are block diagrams illustrating select elements of a reflector die according to an embodiment to provide a reflective target area for an optical signal.

FIG. 1A is block diagram illustrating—from a first view 100*a*—select elements of a reflector die 105, according to an embodiment, to provide a target area for directing an optical signal. Reflector die 105 may be made from, or otherwise comprised of, a high resistance silicon substrate, where a low doping of the substrate mitigates capacitive effects in high frequency signal communications. First view 100*a* shows a coupling surface 110 of reflector die 105 for coupling reflector die 105 to one or more other dies—e.g. to form a die assembly. In an embodiment, such a die assembly may be packaged in a device for processing an optical signal which is received, for example, from a fiber-optic cable, waveguide, or other similar signal communication media.

One or more sides, or edges, of coupling surface 110 may be defined, respectively, by one or more other surfaces—referred to herein as side surfaces—of the reflector die 105 which adjoin coupling surface 110. One or more such side surfaces may, for example, be considered "vertical" surfaces with respect to the comparatively "horizontal" coupling surface 110. By way of illustration and not limitation, a side surface 120 of reflector die 105—shown edge-on in view 100*a*—may at least partially adjoin coupling surface 110 to define a side thereof. Alternatively or in addition, side surface 120 may at least partially define a side of coupling surface 110 by providing a surface to which a bevel may be formed with coupling surface 110. By way of illustration and not limitation, a bevel surface BvS 130 of reflector die 105 is formed by a bevel to coupling surface 110 and side surface 120. Other side surfaces are shown in view 100*a* merely to illustrate some terminal extent of reflector die 105.

In an embodiment, BvS 130 may provide a target area for an optical signal to be reflected by reflector die 105. A reflective coating—indicated by a shaded region in view 100*a*—may be deposited on BvS 130 to reflect light (e.g. a laser signal) which is incident upon a target area thereof. In an embodiment, the reflective coating provides an optical quality mirror finish to at least a portion of BvS 130. It is understood that additional, smaller and/or alternative reflective surfaces may be deposited on reflector die 105, in various embodiments.

Reflector die 105 may further include one or more grooves in the coupling surface 110, each of the one or more grooves providing a respective point of leverage for alignment of an optical signal target area of BvS 130. In an embodiment, the one or more alignment grooves may variously extend along coupling surface 110 and through a side surface—such as surface 120—defining a side of coupling surface 110. Alternatively or in addition, the one or more alignment grooves may variously extend through a bevel surface such as BvS 130. In the illustrative case of first view 100*a*, coupling surface 110 is shown as including two grooves 140 which each extend through side surface 120 on either side of the bevel forming BvS 130.

It is understood that, according to various embodiments, reflector die 105 may include any of a variety of additional or alternate configurations of a bevel surface formed by a bevel to a coupling surface and a side surface and one or more grooves in the coupling surface for an aligning of a target area in the bevel surface.

Figure 1B:
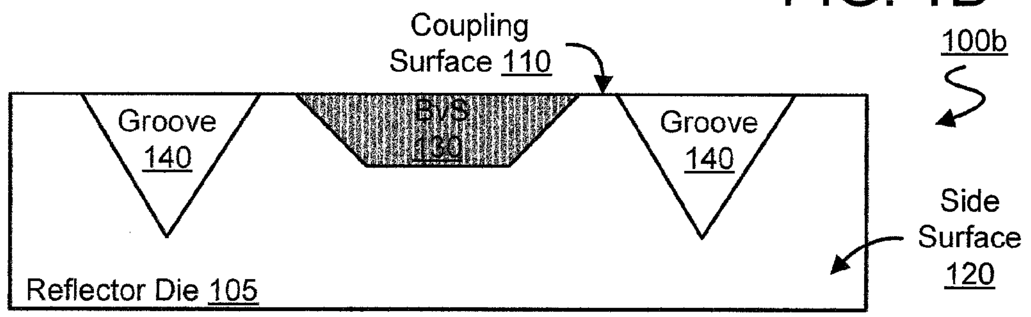

FIG. 1B is block diagram illustrating—from a second view 100*b*—select elements of reflector die 105. View 100*b* shows side surface 120 face-on, while coupling surface 110 is viewed edge-on. In an embodiment, BvS 130 may, in combination with the reflective coating of BvS 130, provide a target area which reflects an optical signal incident upon reflector die 105 after passing through a plane defined by side surface 120. In an embodiment, BvS 130 is formed by a 54.7 degree or less bevel angle to the coupling surface 110—e.g. a forty-five degree (45°) angle. For example, a 54.7 degree angle in a crystal plane may form naturally upon anisotropic etching. The angle may be less than 54.7 degrees if the chosen etchant to the crystal plane has lower selectivity.

View 100*b* also shows respective intersections of grooves 140 with side surface 120. A particular groove 140 may be characterized, for example, according to a width along the side defined by coupling surface 110 and another surface—e.g. side surface 120—through which the groove 140 extends. Alternatively or in addition, a groove 140 may be characterized according to a depth below coupling surface 110 and/or a length of extension along coupling surface 110 and away from the surface of intersection—e.g. side surface 120. By way of illustration and not limitation, the width and depth of groove 140 may be 500 μm and 350 μm, respectively. However, it is understood that the respective dimensions of one or more grooves 140 may vary in different embodiments. For example, certain dimensions of the one or more grooves 140 may be chosen based on a particular alignment tool to be used in aligning a target area of BvS 130.

In an embodiment, BvS 130 may be characterized according to a width of BvS 130 along a direction defined by intersecting planes defined, respectively, by coupling surface 110 and side surface 120. Alternatively or in addition, BvS 130 may be characterized according to a length of extension in coupling surface 110 and away from side surface 120 and/or a length of extension in side surface 120 and away from coupling surface 110.

In an embodiment, size, shape and/or orientation of BvS 130 may be chosen based on dimensions of one or more photodetectors to receive laser light which has been reflected from reflector die 105. For example, one or more dimensions of BvS 130 may be chosen to present a particular target profile to a set of photodetector elements in a photodetector die (not shown) which is coupled to coupling surface 110. In an embodiment, BvS 130 may have a length sufficient to present a target profile for each of a set of photodetector elements spanning a 1000-1500 μm length along a direction defined by intersecting planes defined, respectively, by coupling surface 110 and side surface 120

Figure 1C:
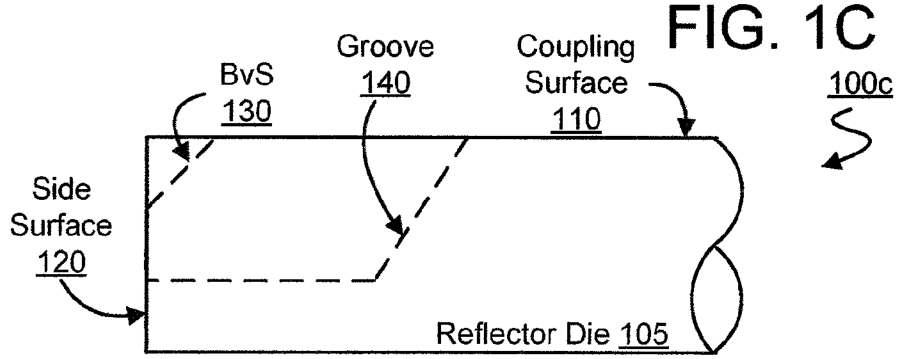
Figure 2:
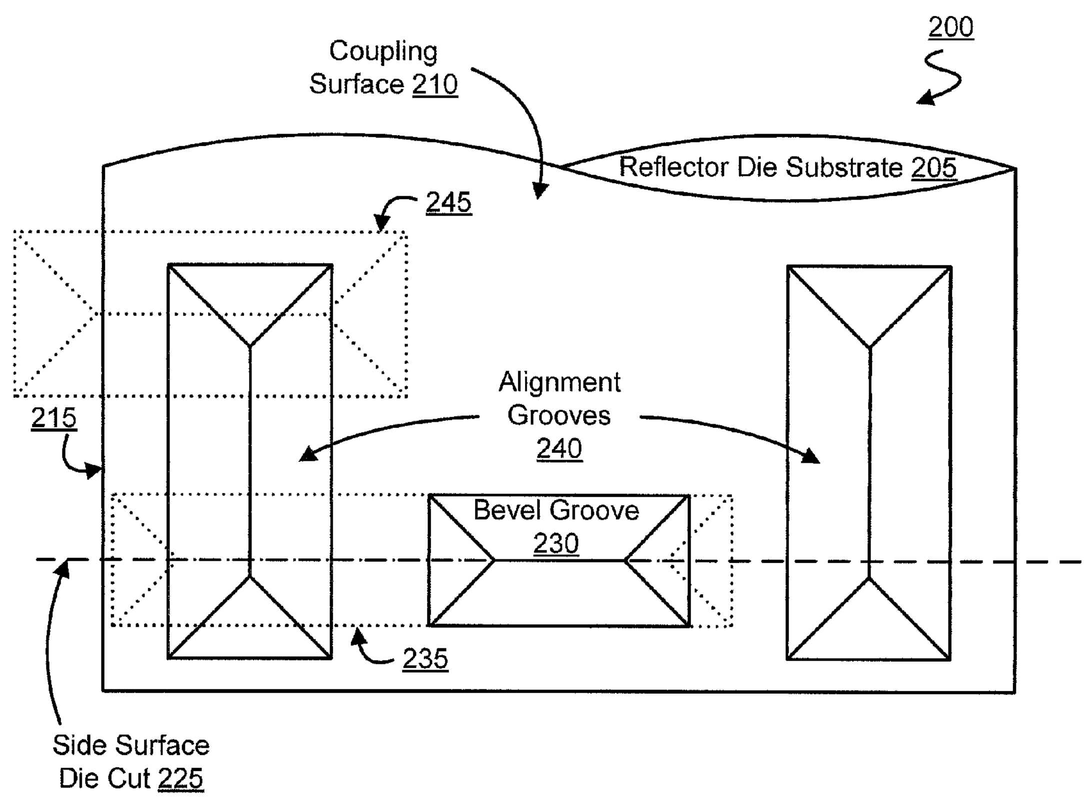
FIG. 2 is a block diagram illustrating select elements of a substrate which is etched and cut to provide a reflector die according to an embodiment.

FIG. 1C is block diagram illustrating—from a third view 100*c*—select elements of reflector die 105. In view 100*c*, both coupling surface 110 and side surface 120 are shown edge on. View 100*c* also illustrates for each of BvS 130 and a groove 140 a respective length of extension along coupling surface 110 and away from surface 120. It is understood that, in various embodiments, the illustrated structures of reflector die 105 may vary—e.g. in terms of the shape and scale of groove 140, the shape and scale of BvS 130 and/or the relative configuration of BvS 130 and groove 140 with respect to one another FIG. 2 is a view 200 illustrating select elements of a reflector die substrate 205 according to an embodiment. Structures on reflector die substrate 205 may be formed on a substrate wafer, and then cut from the wafer to form a reflector die. In an embodiment, the resulting die includes some or all of the features of reflector die 105. For example, a region of a coupling surface 210 of reflector die substrate 205 may correspond to coupling surface 110, in an embodiment. Various side surfaces—e.g. side surface 215—of the reflector die substrate 205 are illustrative of side surfaces which may be formed in a final resulting reflector die. However, it is understood that such side surfaces may not necessarily be yet formed at the time of fabricating other structures—e.g. various grooves—illustrated in view 200.

Reflector die substrate 205 may include a bevel groove 230 and one or more alignment grooves 240 formed in coupling surface 210. At some point during fabrication, part of the cutting of a reflector die out of reflector die substrate 205 may include performing a side surface die cut 225. For example, side surface die cut 225 may cut along—e.g. bisect—the length of bevel groove 230 so that a portion of bevel groove 230, which remains as part of the resulting die, forms a bevel between coupling surface 210 and the side surface which results from side surface die cut 225. The resulting bevel may include some or all of the features of BvS 130, in an embodiment.

In an embodiment, some or all of bevel groove 230 and the one or more alignment grooves 240 may be formed in coupling surface 210 before a final reflector die is cut from reflector die substrate 205. Such grooves in coupling surface 210 may be formed using a crystallographic etch process such as a potassium hydroxide (KOH) etch, a tetra methyl ammonium hydroxide (TMAH) etch, an ethylene diamine pyrocatechol (EDP) etch, an ammonium hydroxide (NH4OH) etch or other such etch process. The etch process may form some or all of the illustrated groove structures in reflector die substrate 205—using a patterned silicon nitride or thermal oxide mask, for example.

After formation of the one or more grooves 240 and bevel groove 230, an area of coupling surface 110 may be metalized—e.g. including depositing a reflective coating on a surface of bevel groove 230. For example, an area of bevel groove 230 which is to form the bevel surface of the final resulting reflector die may be coated with gold (Au) to provide reflectivity of a target area thereon. Such metallization may be performed with sputtering, evaporation, or other such techniques for depositing a gold or other reflective metal coating to give the bevel surface an optical quality mirror finish.

After formation of bevel groove 230 and one or more alignment grooves 240 in reflector die substrate 205, and after metallization of at least the reflective portion of bevel groove 230, a reflector die including these grooves may be cut from reflector die substrate 205, including performing side surface die cut 225. It is understood that cutting the reflector die from reflector die substrate 205 may be performed after additional structures for the reflector die (not shown) are fabricated on reflector die substrate 205. For example, side surface die cut 225 and/or any other such cuts may be performed after signal traces and/or bonding structures (e.g. bond pads and/or stud bumps) have been variously deposited on the coupling surface 210. Additionally or alternatively one or more other dies may be bonded to the coupling surface 210 before the reflector die is cut from the reflector die substrate 205—i.e. where the die as cut is already coupled to the one or more other dies. In an embodiment, the reflector die is cut from reflector die substrate 205 prior to any bonding of the reflector die to a packaging substrate.

For the sake of illustrating features according to certain alternate embodiments, view 200 shows an alternate position 235 for a bevel groove and an alternate position 245 for an alignment groove. Alternate position 235 is illustrative of an embodiment in which, in a final resulting die cut from reflector die substrate 205, an alignment groove 240 will extend through the bevel which is fabricated from the alternate bevel groove 235. Additionally or alternatively, alternate position 245 is illustrative of an embodiment in which, in a final resulting die cut from reflector die substrate 205, an alternate alignment groove 245 will extend through a side face 215 which is not the side face of the bevel formed from bevel groove 230. It is understood that various other configurations of alignment groove 240 and bevel groove 230 with respect to one another may be implemented, according to various embodiments.

FIG. 3A is a first view 300*a* illustrating select elements of a method to fabricate, according to an embodiment, an apparatus for directing an optical signal. The fabrication may include operations to create various structures of a reflector die 305. Reflector die 305 may include some or all of the features of reflector die 105, for example. In an embodiment, reflector die 305 may represent the final resulting reflector die cut from reflector die substrate 205.

In an embodiment, fabrication of structures for reflector die 305 may include etching one or more alignment grooves 340 in a coupling surface 310 for reflector die 305, and forming a bevel surface BvS 330 by creating a bevel between coupling surface 310 and a side surface 320 of reflector die 305. Creation of BvS 330 may, for example, be according to according to the techniques described with respect to bevel groove 230. Fabrication of structures for reflector die 305 may further include depositing of a reflective coating on BvS 330. Although shown as a separate reflector die 305, it is understood that various ones of the fabrication operations illustrated in FIGS. 3A-3F may be performed before the reflector die 305 has been cut from a substrate wafer.

Metallization processes may additionally or alternatively be implemented to dispose on coupling surface 310 one or more traces 355 and/or one or more bonding structures 350—e.g. bond pads and/or stud bumps. The particular number, size, shape, configuration, etc. of such traces 355 and/or bonding structures 350 may depend on one or more dies to be bonded with coupling surface 310. In an embodiment, metals such as gold or nickel/gold may be deposited to form such traces 355 and/or bonding structures 350—e.g. using deposition processes compatible with the topography existing on the substrate wafer of reflector die 305. For example, lithography may be applied using spray coating or an electrodeposit resist if standard thick-resist spin-coating is not possible.

FIG. 3B is a second view 300*b* illustrating select elements of the fabrication method illustrated in FIG. 3A. View 300*b* shows side surface 320 face-on, while coupling surface 310 is viewed edge-on. It is understood that, in an embodiment, side surface 320 may be formed only after additional or alternate structures are etched in, and/or deposited on, a substrate wafer from which reflector die 305 is later cut.

Figures 3C, 3D:
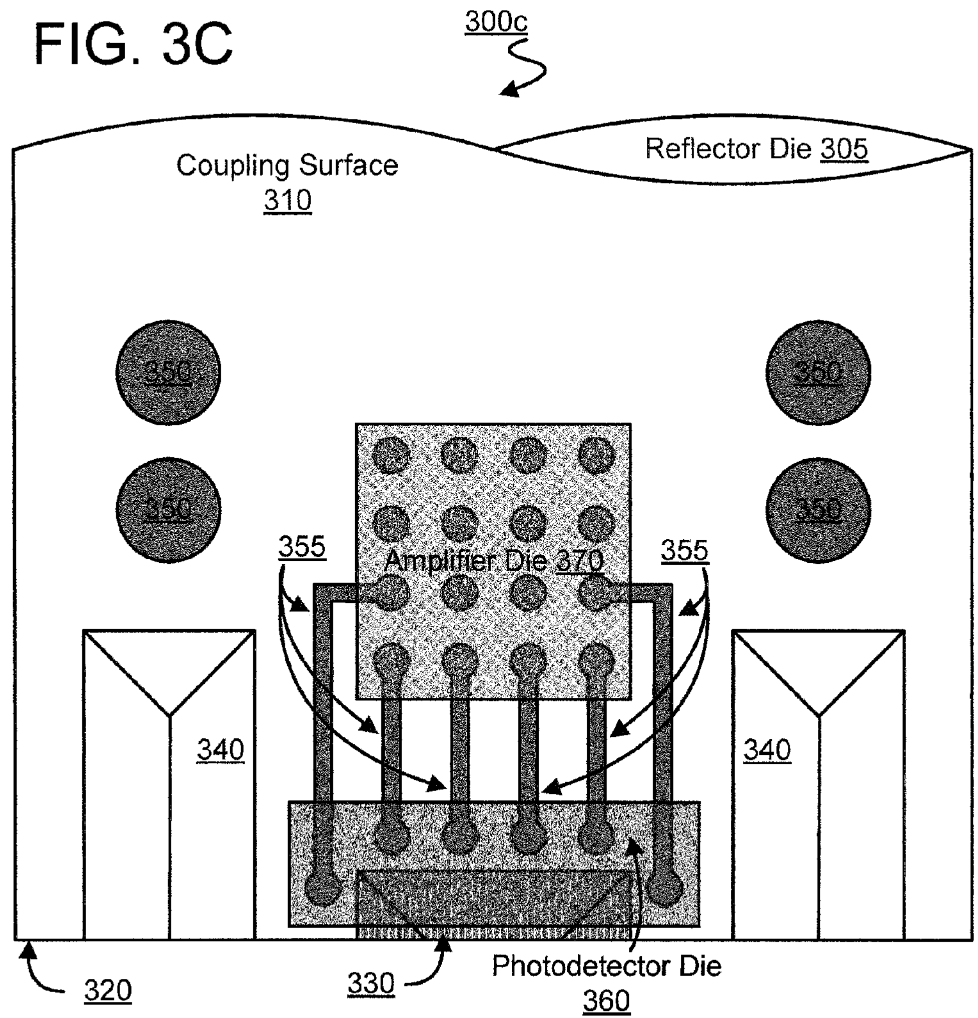
FIGS. 3C and 3D are block diagrams illustrating select elements of a method for bonding a reflector die to create a die assembly according to an embodiment.

FIG. 3C is a third view 300*c* illustrating select elements of the fabrication method illustrated in FIGS. 3A and 3B. View 300*c* illustrates an exemplary embodiment in which a die assembly is created by bonding one or more integrated circuit dies to coupling surface 310.

For example, a photodetector die 360 may be bonded to one or more bonding structures 350 disposed on coupling surface 310. The photodetector may be, for example, a germanium photo-diode, or other type of photodetector. Photodetector die 360 may include one or more photodetector elements to receive an optical signal for conversion to a corresponding electrical signal. In an embodiment, photodetector die 360 may include one or more normal-incidence amplifiers. Bonding photodetector die 360 to coupling surface 360 may include positioning an active area—e.g. a detecting area—of photodetector die 360 to overlap and face an area of BvS 330 on which the reflective coating is disposed. For example, an overlap of BvS 330 with an active area of photodetector die 360 may be, for example, along a direction normal to side surface 320. Such positioning of photodetector die 360 with respect to the reflective coating of BvS 330 may allow an optical signal incident upon a target area of BvS 330 to reflect onto an active area of photodetector die 360.

Additionally or alternatively, an amplifier die 370 may be bonded to one or more other bonding structures 350 disposed on coupling surface 310. In an embodiment, the one or more boding structures 350 which bond to photodetector die 360 and the one or more other boding structures 350 which bond to amplifier die 370 may be variously coupled by respective ones of traces 355 disposed on coupling interface. Such traces 355 may allow photodetector die 360 to provide to amplifier 370 an electrical signal generated by detecting and converting an optical signal reflected from BvS 330. Amplifier die 370 may amplify a signal received from photodetector die 360 via traces 355 before providing the amplified signal to other circuit components (not shown). In an embodiment, amplifier die 370 includes a transimpedance amplifier (TIA).

Photodetector die 360 and amplifier die 370 may each include respective bonding structures (e.g. bond pads and/or stud bumps, not shown) for bonding to corresponding ones of bonding structures on coupling surface 310. In one embodiment, photodetector die 360 and/or amplifier die 370 may, for example, have aluminum, gold or similar pads which are gold stud bumped. Either or both dies may then be bonded to respective ones of bonding structures 350. Such bonding may be performed, for example, using thermocompression or thermosonic bonding.

FIG. 3D is a fourth view 300*d* illustrating select elements of the fabrication method illustrated in FIGS. 3A to 3C. View 300*d* shows side surface 320 face-on, while coupling surface 310 is viewed edge-on. In an embodiment, bonding of photodetector die 360 and/or amplifier die 370 to coupling surface 310 may be performed after reflector die 305 has been cut from a substrate wafer. Cutting reflector die 305 from the substrate wafer may variously create one or more of the side surfaces—e.g. including side surface 320—wherein the alignment grooves 340 variously extend through respective ones of the one or more side surfaces.

Extension of an alignment groove though a side surface—e.g. one or more grooves 340 though side surface 320—and/or BvS 130 may provide access to the alignment groove 340. The one or more alignment grooves 340 may therefore provide respective leverage points for alignment pins to give precise alignment of a die with respect to a target area of BvS 330 for coupling the die to coupling surface 310. In an embodiment, some or all of alignment grooves 340 may receive respective aligning pins imparting leverage for precise manipulation, positioning and/or securing of photodetector die 360 and/or amplifier die 370 for bonding to coupling surface 310.

Figures 3E, 3F:
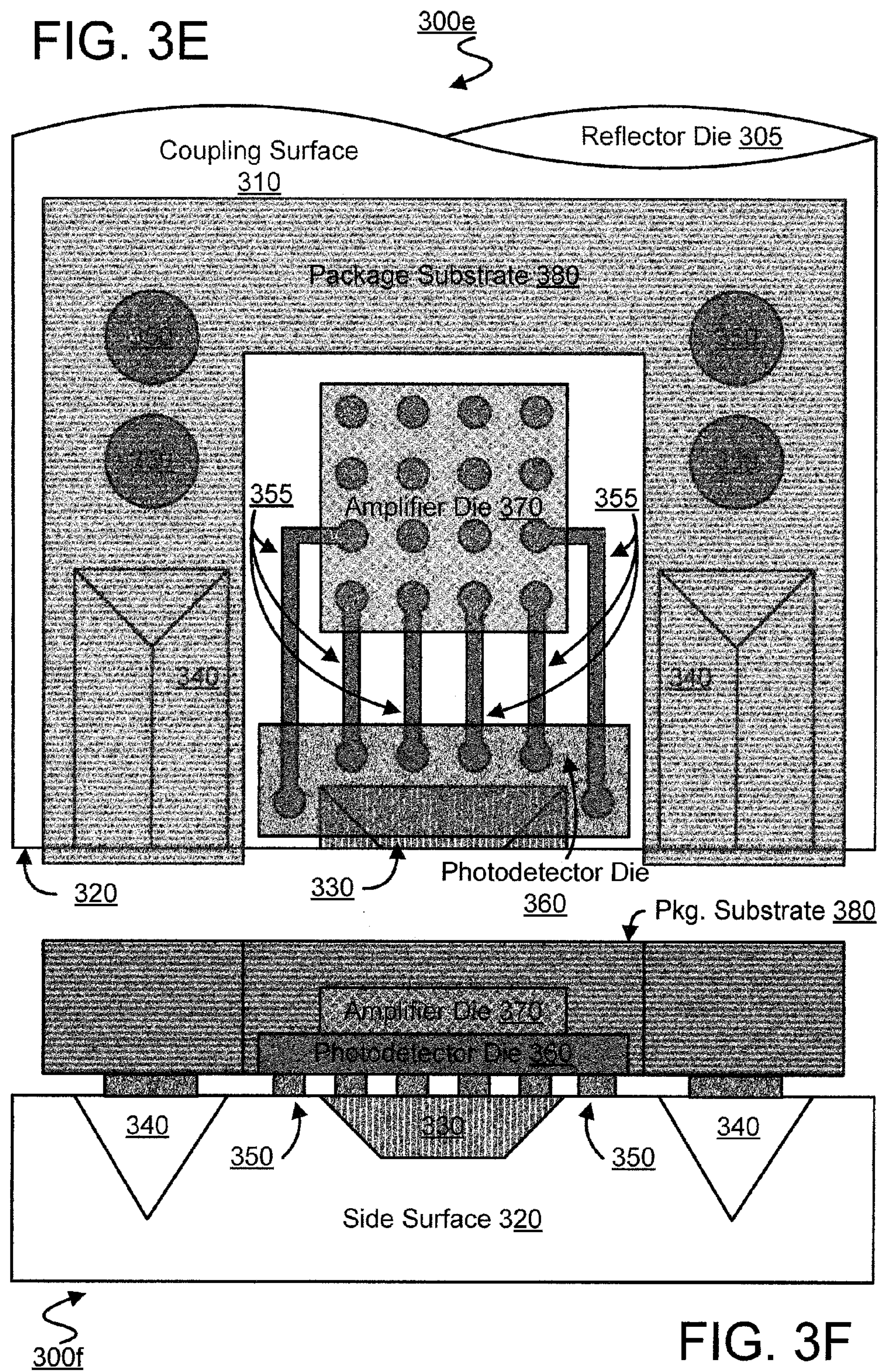
FIGS. 3E and 3F are block diagrams illustrating select elements of a method for packaging a die assembly according to an embodiment.

FIG. 3E is a fifth view 300*e* illustrating select elements of the fabrication method illustrated in FIGS. 3A to 3D. View 300*e* illustrates features of an operation to package the die assembly shown in view 300*c*. In an embodiment, a die assembly including reflector die 305, photodetector die 360 and amplifier die 370 may be bonded to a package substrate 380—e.g. with one or more bonding structures 350 disposed on coupling surface 310. The package substrate 380 may be a laminate material such as FR-4 or other such material used in integrated circuit packaging. Package substrate 380 is illustrative of one type of packaging substrate, and it is understood that any of a variety of additional or alternative packaging structures may be bonded to the die assembly. Bonding of package substrate 380 may, for example, be done using a standard soldering process. In one embodiment, a Ni/Au deposition of bond structures 350 would function as an underbump metallurgy compatible with a standard lead-free solder to form this connection, with nickel as a barrier and gold as a whetting material.

FIG. 3F is a sixth view 300*f* illustrating select elements of the fabrication method illustrated in FIGS. 3A to 3E. The combination of die assembly and package substrate 380 may be provided as, or incorporated into, an apparatus for receiving an optical signal for conversion to an electrical signal. Such an apparatus may include an optical universal serial bus (USB) device, for example.

Figure 4:
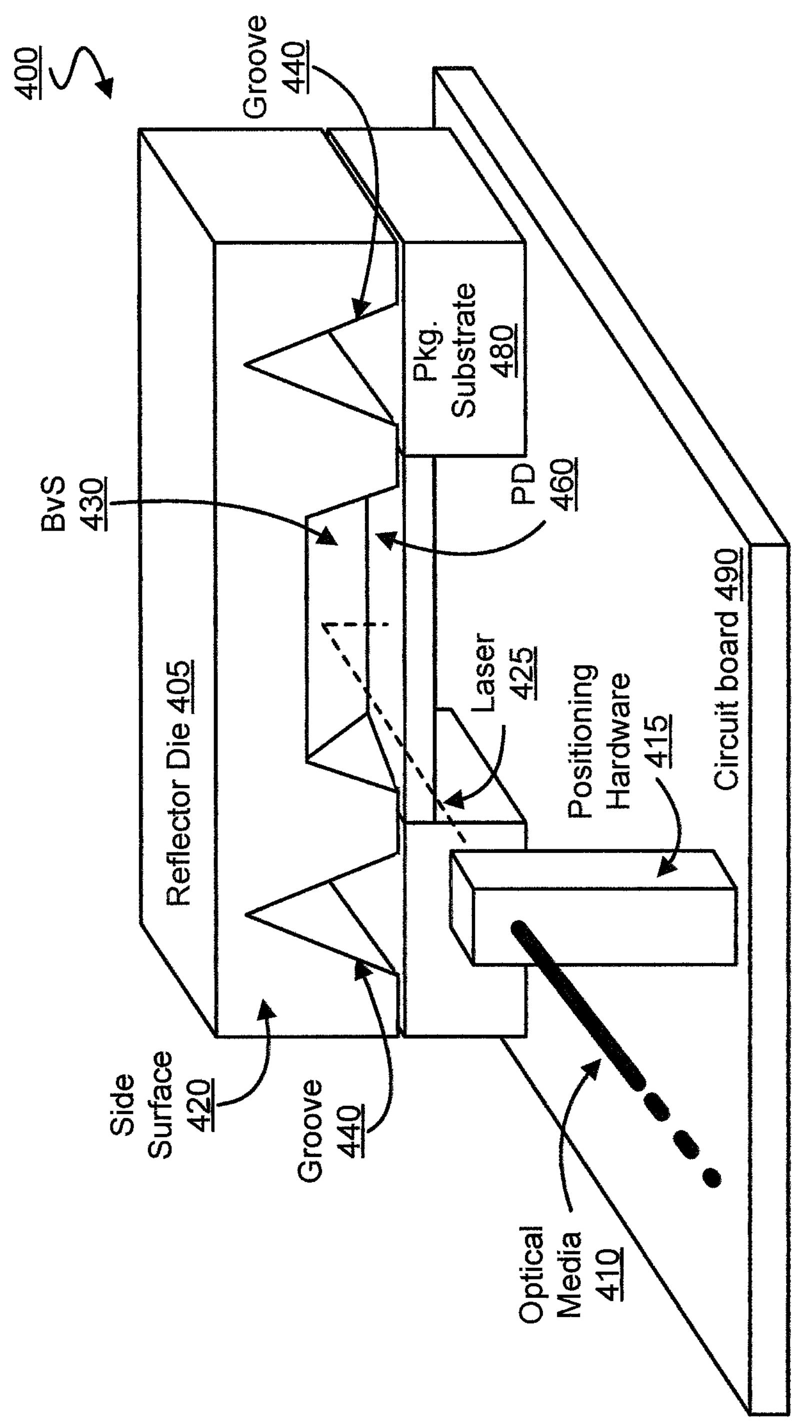
FIG. 4 is a block diagram illustrating select elements of a system for directing and processing an optical signal according to an embodiment.

FIG. 4 is a high-level illustration of select elements in a system 400 according to an embodiment, the system 400 for directing and processing an optical signal. System 400 may include optical signal reflecting and conversion structures such as those generated by the operations of FIGS. 3A through 3F. In an illustrative embodiment, system 400 may include a die assembly including a reflector die 405, photodetector die PD 460, and package substrate 480. System 400 may further include an amplifier (not shown) to amplify an electric signal which PD 460 generates by converting an optical signal.

For example, system 400 may include an optical media 410—e.g. a fiberoptic cable or waveguide—to direct a laser signal 425 to a bevel surface BvS 430 of reflector die 405. A circuit board 490 may include or couple to positioning hardware 415 to position and/or orient the optical media 410 for direction of laser 425 toward a target area of BvS 430. In an embodiment, BvS 430 may include a reflective coating on the target area to reflect the laser signal 425 onto an active area of PD 460. It is understood that grooves 440 and/or BvS 430 may vary in scale or configuration—e.g. either in relation to one another and/or in relation to other structures in system 400. In an embodiment, cylindrical pins (not shown) may be affixed into grooves 440 and extend outward perpendicular from the side surface 420, such that a molded plastic lens array may be attached with high precision to the system 400 using these pins for alignment.

Techniques and architectures for providing a reflective target area for an integrated circuit die assembly are described herein. In the above description, for purposes of explanation, numerous specific details are set forth in order to provide a thorough understanding of certain embodiments. It will be apparent however, to one skilled in the art, that certain other embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of certain embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:
a reflector die including:
one or more side surfaces including a first side surface;
a coupling surface to couple the reflector die;
a flat bevel surface formed by a bevel to a first flat portion of the coupling surface and to a second flat portion of the first side surface, the bevel surface to provide a target area for an optical signal, wherein the bevel surface and the one or more side surfaces define one or more edges the coupling surface, wherein the one or more side surfaces are each perpendicular to and face away from the coupling surface, and wherein the bevel surface faces away from the second flat portion;
one or more grooves in the coupling surface, each of the one or more grooves extending through a respective one of the bevel surface and the one or more side surfaces, the one or more grooves each to receive a respective alignment pin for an aligning of the target area; and
a reflective coating deposited on the bevel surface, the reflective coating to reflect the optical signal.

2. The apparatus of claim 1, the reflector die further comprising bonding structures coupled to the coupling surface.

3. The apparatus of claim 2, further comprising:
a photodetector die coupled to the coupling surface via the bonding structures, the photodetector die to receive the reflected optical signal, the photodetector die further to convert the optical signal into an electrical signal.

4. The apparatus of claim 2, the reflector die further comprising one or more traces deposited on the coupling surface, the one or more traces coupled to the bonding structures.

5. The apparatus of claim 4, further comprising:
a photodetector die coupled to coupling surface, the photodetector die to receive the reflected optical signal, the photodetector die further to convert the optical signal into an electrical signal, wherein the one or more traces to communicate the electrical signal from the photodetector.

6. The apparatus of claim 4, further comprising:
an amplifier die coupled to the one or more traces to receive and to amplify an electrical signal.

7. A method comprising:
etching in a coupling surface of a reflector die substrate:
one or more alignment grooves; and
a bevel groove;
depositing a reflective coating on a surface of the bevel groove; and
after the etching, cutting a reflector die from the reflector die substrate, the cutting forming one or more side surfaces defining one or more edges of the coupling surface, wherein the one or more side surfaces are each perpendicular to and face away from the coupling surface, the cutting including performing a cut to form a first side surface of the one or more side surfaces, the cut bisecting the bevel groove to form a bevel to a first flat portion of the coupling surface and to a second flat portion of the first side surface, the bevel including a flat bevel surface having the reflective coating deposited thereon, wherein the bevel surface faces away from the second flat portion, wherein the one or more alignment grooves each extend through a respective one of the bevel surface and the one or more side surfaces.

8. The method of claim 7, further comprising depositing bonding structures to the coupling surface.

9. The method of claim 8, further comprising bonding a photodetector die to the coupling surface via the bonding structures.

10. The method of claim 9, wherein the bonding the photodetector die includes aligning the bevel surface and the photodetector die, the aligning including applying leverage to the reflector die via the one or more alignment grooves.

11. The method of claim 8, further comprising depositing one or more traces on the coupling surface, the one or more traces coupled to the bonding structures.

12. The method of claim 11, further comprising bonding a photodetector die to the coupling surface, including coupling the photodetector die to the one or more traces via the bonding structures.

13. The method of claim 11, further comprising bonding an amplifier die to the coupling surface, including coupling the amplifier die to the one or more traces via the bonding structures.

14. A computer-readable storage medium having stored thereon instruction which, when executed by one or more processors, cause the one or more processors to perform a method comprising:
etching in a coupling surface of a reflector die substrate:
one or more alignment grooves; and
a bevel groove;
depositing a reflective coating on a surface of the bevel groove; and
after the etching, cutting a reflector die from the reflector die substrate, the cutting forming one or more side surfaces defining one or more edges of the coupling surface, wherein the one or more side surfaces are each perpendicular to and face away from the coupling surface, the cutting including performing a cut to form a first side surface of the one or more side surfaces, the cut bisecting the bevel groove to form a bevel to a first flat portion of the coupling surface and to a second flat portion of the first side surface, the bevel including a flat bevel surface having the reflective coating deposited thereon, wherein the bevel surface faces away from the second flat portion, wherein the one or more alignment grooves each extend through a respective one of the bevel surface and the one or more side.

15. The computer-readable storage medium of claim 14, the method further comprising depositing bonding structures to the coupling surface.

16. The computer-readable storage medium of claim 15, the method further comprising bonding a photodetector die to the coupling surface via the bonding structures.

17. The computer-readable storage medium of claim 16, wherein the bonding the photodetector die includes aligning the bevel surface and the photodetector die, the aligning including applying leverage to the reflector die via the one or more alignment grooves.

18. The computer-readable storage medium of claim 15, the method further comprising depositing one or more traces on the coupling surface, the one or more traces coupled to the bonding structures.

19. The computer-readable storage medium of claim 18, the method further comprising bonding a photodetector die to the coupling surface, including coupling the photodetector die to the one or more traces via the bonding structures.

20. The computer-readable storage medium of claim 18, the method further comprising bonding an amplifier die to the coupling surface, including coupling the amplifier die to the one or more traces via the bonding structures.

21. A system comprising:
a reflector die including:

one or more side surfaces including a first side surface;

a coupling surface to couple the reflector die;

a flat bevel surface formed by a bevel to a first flat portion of the coupling surface and to a second flat portion of the first side surface, the bevel surface to provide a target area for an optical signal, wherein the bevel surface and the one or more side surfaces define one or more edges the coupling surface, wherein the one or more side surfaces are each perpendicular to and face away from the coupling surface, and wherein the bevel surface faces away from the second flat portion;

one or more grooves in the coupling surface, each of the one or more grooves extending through a respective one of the bevel surface and the one or more side surfaces, the one or more grooves each to receive a respective alignment pin for an aligning of the target area; and a reflective coating deposited on the bevel surface, the reflective coating to reflect the optical signal; and a circuit board coupled to the reflector die to exchange one or more signals based on the optical signal.

22. The system of claim 21, the reflector die further comprising bonding structures coupled to the coupling surface.

23. The system of claim 22, further comprising:

a photodetector die coupled to the coupling surface via the bonding structures, the photodetector die to receive the reflected optical signal, the photodetector die further to convert the optical signal into an electrical signal.

24. The system of claim 22, the reflector die further comprising one or more traces deposited on the coupling surface, the one or more traces coupled to the bonding structures.

25. The system of claim 24, further comprising:

a photodetector die coupled to coupling surface, the photodetector die to receive the reflected optical signal, the photodetector die further to convert the optical signal into an electrical signal, wherein the one or more traces to communicate the electrical signal from the photodetector.

26. The system of claim 24, further comprising:

an amplifier die coupled to the one or more traces to receive and to amplify an electrical signal.

* * * * *

UNITED STATES PATENT AND TRADEMARK OFFICE

CERTIFICATE OF CORRECTION

PATENT NO. : 8,530,818 B2
APPLICATION NO. : 12/825257
DATED : September 10, 2013
INVENTOR(S) : Heck et al.

It is certified that error appears in the above-identified patent and that said Letters Patent is hereby corrected as shown below:

In the Specification

Please insert in column 1, line 5 before BACKGROUND:

--STATEMENT OF GOVERNMENT INTEREST

This invention was made with Government support under contract number H98230-08-3-0011 awarded by the Department of Defense. The Government has certain rights in this invention.--

Signed and Sealed this
First Day of December, 2015

Michelle K. Lee

Michelle K. Lee
*Director of the United States Patent and Trademark Office*